United States Patent [19]

Trolinger

[11] Patent Number: 4,564,949
[45] Date of Patent: Jan. 14, 1986

[54] FOLDED CAVITY LASER FOR HOLOGRAPHY

[75] Inventor: James D. Trolinger, Costa Mesa, Calif.

[73] Assignee: Spectron Development Laboratories, Costa Mesa, Calif.

[21] Appl. No.: 726,959

[22] Filed: Apr. 26, 1985

Related U.S. Application Data

[63] Continuation of Ser. No. 499,497, Dec. 13, 1982, abandoned.

[51] Int. Cl.[4] ............................................. H01S 3/081
[52] U.S. Cl. ...................................... 372/93; 372/16; 372/19
[58] Field of Search .......................................... 372/16

[56] References Cited

U.S. PATENT DOCUMENTS 3,447,098 5/1969 Eckberg .............................. 372/99
3,904,983 9/1975 Moreno et al. ...................... 372/19
3,995,230 11/1976 See ...................................... 372/93

Primary Examiner—William L. Sikes
Assistant Examiner—Robert E. Wise
Attorney, Agent, or Firm—Blakely Sokoloff Taylor & Zafman

[57] ABSTRACT

An improved folded cavity laser having particular application to holographic imaging is disclosed. The laser includes a lasing medium, such as for example a ruby rod, which is optically or electronically "pumped" in order to provide laser light. The medium includes first and second optical surfaces disposed at opposite ends of the lasing medium. A retro-reflecting roof mirror is disposed in optical alignment with the second optical surface of the lasing medium. A transverse mode selector is provided in optical alignment with the first surface of the lasing medium in order to surpress all transverse modes except those of a desired character. In the present embodiment, the transverse mode selector includes two apertures of approximately two millimeters diameter in order to obtain a laser output with a $TEM_{00}$ mode. The use of a twin aperture transverse mode selector in conjunction with a retro-reflecting roof mirror provides at least twice the total cavity length and lasing medium than a conventional holographic pulsed laser, as well as two output beams which are in phase and coherent with each other. These beams may be directly used as an object and reference beam in a holographic system.

5 Claims, 5 Drawing Figures

Fig. 2
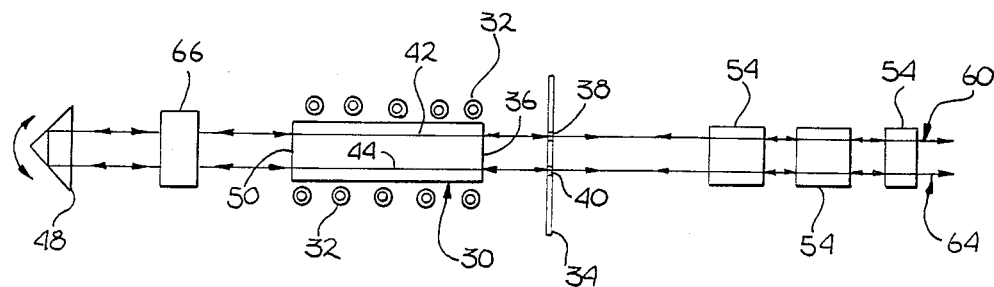
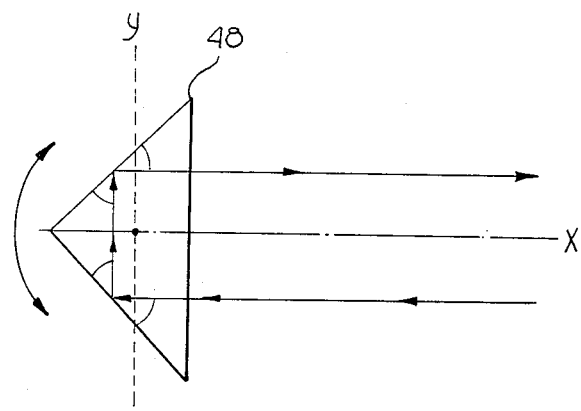
Fig. 3
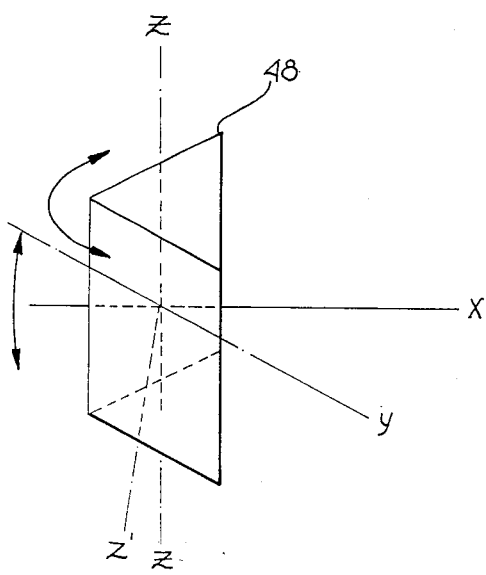
Fig. 4

FOLDED CAVITY LASER FOR HOLOGRAPHY

This application is a continuation of application Ser. No. 499,497, filed Dec. 13, 1982, now abandoned.

BACKGROUND OF THE INVENTION

1. Field

The present invention relates to the field of pulsed lasers, and more particularly to pulsed lasers used for holography.

2. Art Background

Lasers have been utilized in many engineering and scientific applications for a variety of purposes. For example, lasers may be used as an optical "stylus" for playing pre-recorded television presentations on plastic disks similar to phonograph records, or may be used in military applications such as laser-directed bombs and anti-missile weapons. Another promising use of lasers is in the field of wave front reconstruction, frequently referred to as holography. Holography provides a scientist with a means for recreating images such that the images appear to originate from an actual object. Holography has found application in a number of areas, such as the high accuracy measurement of an object's dimensions, the "freezing" of short lived processes such as particulate combustion, holographic interferometry, holographic optical memories, as well as numerous other terrestrial and space applications.

In general, a holographic recording system includes a laser light source having of a particular wavelength, which is split by a beam splitter such that two beams are provided. One beam, the reference beam, is passed directly to a recording medium such as a photographic plate. The other beam, referred to as the object beam, is used to irradiate the target object which is the subject of the hologram. The radiation comprising the object beam is scattered and dispersed such that some of the incident radiation interferes with the reference beam on the recording medium. By appropriate processing, an image of the target object can be reconstructed and viewed from different angles and elevations, such that a three-dimensional effect is obtained.

Ruby lasers, which provide an instantaneous laser pulse, are the dominant light source in pulsed laser holography. The use of a pulsed laser permits the "freezing" of high speed events, such as combustion processes. Unfortunately, existing ruby lasers which are used for holographic purposes, are adaptations of lasers designed for other uses such as welding. A typical ruby laser rod has a diameter of six to ten millimeters. In order to provide $TEM_{00}$ operation, one must aperture the rod cavity to a diameter of one or two millimeters, which results in a one to two order of magnitude power reduction. Thus, a substantial portion of the ruby rod remains unused in existing holographic imaging systems. By providing appropriate tuning elements, such as etalons, satisfactory laser emissions may be produced by the ruby rod for holographic purposes. However, proper tuning of etalons on either side of the ruby rod is typically complex and involved, and requires a temperature controlled environment in order to minimize thermal induced variations in the optical tuning elements.

Accordingly, there exists a need to provide a means for increasing the total usable energy of a pulse laser for holographic purposes, and simplifying the tuning of the laser output to provide higher quality holographic images. As will be disclosed below, the present invention utilizes a retro-reflecting roof mirror in conjunction with a transverse mode selector in order to provide a folded cavity within the lasing medium to be utilized. Thus, the present invention provides multiple identical beams which may be directly used in holographic systems, thereby eliminating the need for beam splitting. The use of a retro-reflecting roof mirror in conjunction with a transverse mode selector permits numerous variations in the total cavity length, laser energy output, and wavelength.

SUMMARY OF THE INVENTION

An improved pulse folded cavity laser having particular application to holographic imaging is disclosed. The laser includes a lasing medium, such as for example a ruby rod, which is optically or electronically "pumped" in order to provide laser light. The medium includes first and second optical surfaces disposed at opposite ends of the lasing medium. A retroreflecting roof mirror is disposed in optical alignment with the second optical surface of the lasing medium. A transverse mode selector is provided in optical alignment with the first surface of the lasing medium in order to surpress all transverse modes except those of a desired character. In the present embodiment, the transverse mode selector includes two apertures of approximately two millimeter diameter in order to obtain a laser output with a $TEM_{00}$ mode. The use of a twin aperture transverse mode selector in conjunction with a retro-reflecting roof mirror provides at least twice the total cavity length and lasing medium utilized than a conventional holographic pulsed laser, as well as two output beams which are in phase and coherent with each other. These beams may be directly used as an object and reference beam in a holographic system.

An alternate embodiment is disclosed which provides a single beam of increased power by utilizing a portion of the lasing medium as an amplifier.

BRIEF DESCRIPTION OF THE DRAWINGS

FIG. 2 is a plan schematic view of a pulsed laser utilizing the teachings of the present invention.

FIG. 3 is a plan diagrammatical view of the retro-reflecting roof mirror utilized by the present invention.

FIG. 4 is a perspective view of the mirror of FIG. 2.

DETAILED DESCRIPTION OF INVENTION

An improved pulsed folded cavity laser having particular application for use in holographic recording systems is disclosed. In the following description for purposes of explanation, numerous details are set forth such as specific lasing mediums, wavelengths, angles, frequencies, and system configurations, etc., in order to provide a thorough understanding of the present invention. However, it will be apparent to one skilled in the art that the invention may be practiced without these specific details. In other instances, well known components, structures and electrical processing means have not been described in detail in order not to obscure the present invention unnecessarily.

Figure 1:
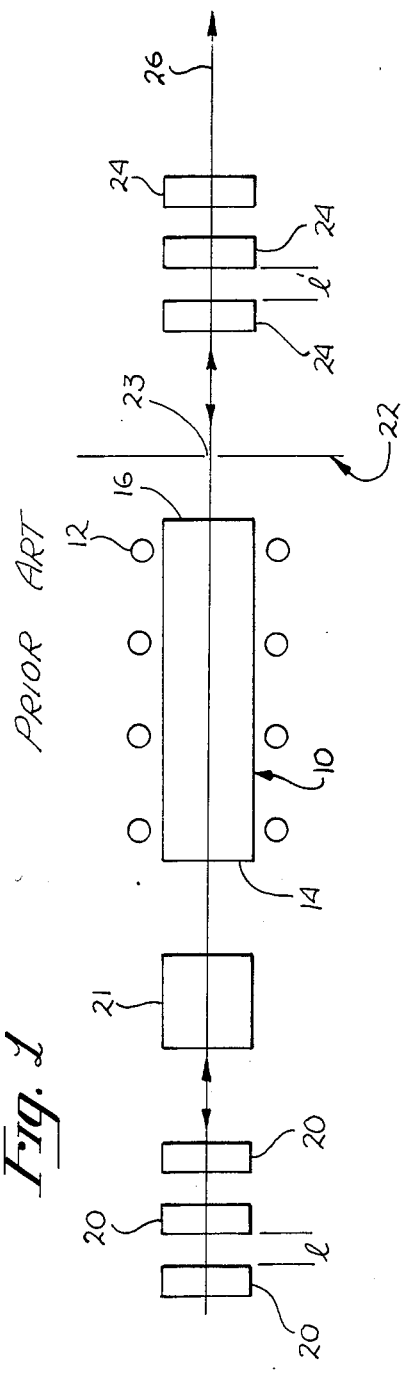
FIG. 1 is a plan schematic view of a typical prior art pulsed laser used for holography.

Referring now to FIG. 1, a typical prior art pulsed laser for use in holography is illustrated. The laser includes a ruby rod lasing medium 10 which is encircled by a flash lamp assembly 12. As is well known, lasing medium 10 generates laser light after being photo-optically "pumped" by flash lamp assembly 12. As is illustrated, lasing medium 10 is generally cylindrical and typically has a diameter of 6 to 10 milimeters. Laser light generated by lasing medium 10 passes outwardly through opposite ends 14 and 16 of the lasing rod 10. Laser energy which passes through rear surface 14 is virtually 100 percent reflected back into the lasing medium 10 by rear etalon reflectors 20. Typically, a Q switch device 21 is disposed between the rear surface 14 of lasing medium 10 and the etalon reflector group 20, in order to preclude lasing until maximum photo-optical pumping of the lasing medium occurs, such that a large virtually instantaneous pulse is generated by the laser configuration.

Inasmuch as commercially available ruby rods are not generally manufactured for pulsed holographic purposes, in order to obtain the necessary coherence required for holography, a transverse mode selector 22 is commonly disposed in front of front surface 16 of the lasing medium 10. The transverse mode selector 22 is provided with an aperture 23 of typically 1-2 millimeters, which results in a power reduction of the laser by a factor of 10 to 100. For example, a laser normally capable of providing 1-2 joules of multimode energy but which is unsuitable for holography, will produce 20-100 millijoules of holographically useful light, as a result of the use of transverse mode selector 22. A front partially reflecting etalon reflector group 24 is disposed in optical alignment with a transverse selector 22 in order to reflect a portion (typically 99 percent) of the generated laser light back through transverse mode selector 22 and into the lasing medium 10, as is well known. An output beam 26 is then used in the particular holographic imaging system.

Thus, as is apparent from FIG. 1, prior art pulsed holographic laser systems incorporate a number of inherent disadvantages. For example, it will be noted that the use of transverse mode selector 22 limits the actual volume of the lasing medium which is used. In addition, etalon reflectors 20 and 24 must be properly tuned such that they are resonant to the same wavelength. Frequently, this tuning process requires accurate placement and separation of each etalon within the etalon reflecting group, and requires a temperature controlled environment in order to prevent thermally induced tuning variations. The requirement of two etalon groups 20 and 24, further complicates the prior art configuration in that the distances "L" between each etalon reflector in the group must be substantially identical.

Referring now to FIG. 2, the configuration of the present invention is disclosed. A lasing medium 20 typically comprised of a cylindrical ruby rod is encircled by a flash lamp assembly 32 which provides optical energy to the rod 30 in order to generate laser light. A transverse mode selector 34 is disposed in optical alignment with a first surface 36 of the lasing medium 30. Transverse mode selection 34 includes apertures 38 and 40 which define folded cavities 42 and 44 within the ruby rod lasing medium 30. For purposes of this Specification the term "cavity" is intended to denote a passage defined through lasing medium 30, in which a laser beam is generated. The cavity length for the laser comprises the optical path distance between the front and rear reflectors.

A retro-reflecting roof mirror 48 is provided in optical alignment with the rear surface 50 of lasing medium 30. As will be described more fully below, the use of roof mirror 48 eliminates the need for a rear etalon reflector assembly and is relatively insensitive to rotation about its longitudinal axis, such that less manufacturing tolerance is required in the mounting mechanism. A front etalon assembly 54 is provided an optical alignment with the apertures 38 and 40, as is typical in the art. It will be noted that the present invention requires only a single etalon group to be tuned, thereby greatly simplifying the tuning of the laser in order to obtain holographic quality laser emissions.

As will be appreciated from FIG. 2, the present invention's use of a retro-reflecting roof mirror 48 in conjunction with a transverse mode selector 34, provides multiple passage of the beam within the lasing medium 30. In addition, the present invention generates two identical, in phase, coherent laser beams which may directly be utilized for holographic purposes. For example, output laser beam 64 may be utilized as the object beam in a holographic recording system. Thus, the present invention as disclosed in FIG. 2 provides twice the lasing medium as a conventional holographic pulse laser configuration, by the use of a folded cavity coupled optically by roof prism 48.

An appropriate Q switch device 66 is generally disposed between roof mirror 48 and optical surface 50 in order to provide necessary Q switching to obtain maximum laser output.

Referring now to FIGS. 3 and 4, the operation of the retro-reflecting roof mirror in the present invention will be described. It has been found that the use of a retro-reflecting roof mirror in order to terminate a pulse laser cavity provides a number of important advantages. (See, Zhou et al, Modes of a Laser Resonator with a Retroflecting Roof Mirror, *Applied Optics*, Vol. 20, No. 20, Oct. 15, 1981). In terms of ease of fabrication, the roof mirror 48 is relatively insensitive to misalignment and, within certain approximations, returns a bundle of rays parallel to its original path, as illustrated in FIG. 3. Thus, the present invention is relatively tolerant of positioning errors of mirror 48 with respect to the X-Y plane. However, rotation of mirror 48 about the "X" axis has been found to be relatively critical. Moreover, it is possible to utilize mirror 48 as a Q switch device, thereby eliminating the need for a separate Q switch 66. In addition, it will be appreciated that the present invention permits beams passing through cavities 42 and 44 to be independently Q switched utilizing multiple Q switches 66, such that two virtually independent laser beams may be generated within the same lasing medium 30.

It will be apparent that a plurality of folded lasing cavities may be defined within lasing medium 30 by the use of additional apertures through traverse mode selector 34. For example, it is possible to produce four beams within medium 30 by defining four apertures in mode selector 34. It will be noted that although the Figures indicate a single aperture in mode selector 34 in order to define a single cavity in lasing medium 30, it has been found that a single aperture effectively defines two cavities. Thus, the presence of aperture 38 in mode selector 34 will generate cavity 44 without the need for aperture 40, as a result of the use of roof mirror 48. Accordingly, aperture 40 is redundant in the FIG. 2 configuration.

Figure 5:
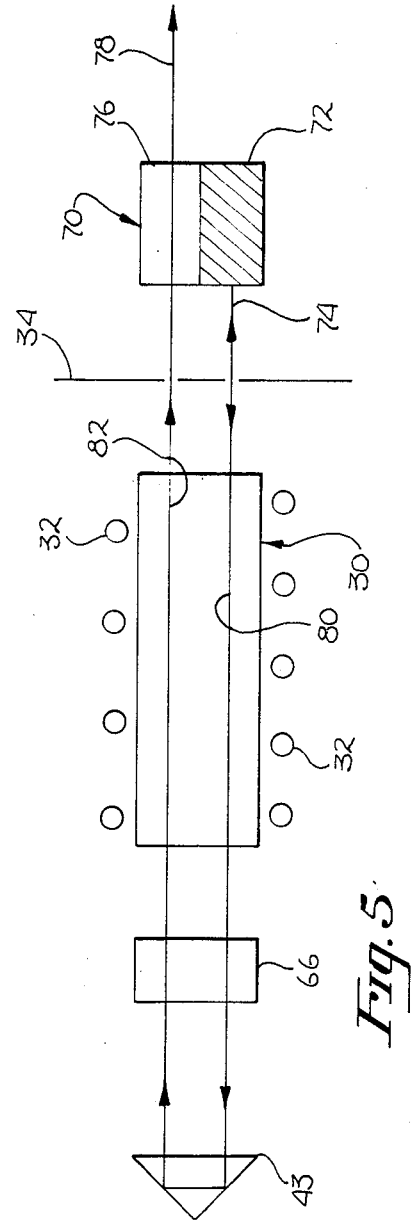
FIG. 5 is a plan diagrammatical view of a pulsed laser utilizing the teachings of the present invention utilizing one cavity as an amplifier and having a single output beam.

With reference now to FIG. 5, another embodiment of a folded cavity pulse laser utilizing the teachings of the present invention is disclosed. As in the embodiment of FIG. 2, the laser configuration includes a lasing means 30 encircled by a flash lamp assembly 32. A roof prism 48 is provided in conjunction with a transverse mode selector 34, as previously discussed. Moreover, a Q switch device 66 is disposed between lasing medium 30 and roof mirror 48, in order to provide appropriate Q switching as is required. An etalon 70 is provided wherein a portion of the etalon 72 reflects substantially 100 percent of incident laser light 74. A second portion 76 of etalon group 70 is provided such that only partial reflection occurs thereby permitting an output beam 78 to pass through. Accordingly, the embodiment disclosed in FIG. 5 provides a amplification system wherein beam 78 is provided with twice the energy of the beams generated by the FIG. 2 embodiment. Thus, cavity 80 through which beam 74 passes acts as an amplifier as a result of the present invention's use of roof mirror 48. Since roof mirror 48 reflects substantially all incident light energy back along a parallel path, light which is amplified in cavity 80 is in phase and coherent with light energy generated in cavity 82 which forms output beam 78.

It will be apparent to one skilled in the art, that the present invention's use of a transverse mode selector 34 in conjunction with a roof mirror 48 permits a variety of laser configurations not possible in the prior art. For example, it is possible to utilize multiple etalon groups 54 for each output beam passing through apertures of the transverse mode selector 34. The use of multiple etalon groups for one or more of the output beams provides simultaneous beams having different wavelengths Thus, there are a variety of possible optical configurations utilizing the present invention's structure.

Although the present invention has been described with reference to FIGS. 1-5, it will be understood that the Figures are for illustration only and should not be taken as limitations upon the invention.

I claim:

1. An improved folded cavity laser, comprising:
    lasing means having front and rear optical surfaces disposed in an optical cavity for generating at least two parallel beams of laser radiation, each beam being equally spaced from the axis of said lasing means;
    said optical cavity comprising mirror means for reflecting said laser radiation, and a retro-reflecting roof prism capable of rotation about the axis of said lasing means, said mirror means and said roof prism aligned with the axis of the lasing means, and said roof prism being large enough to receive substantially all of the radiation from said lasing means;
    pumping means coupled to said lasing means for providing energy to said lasinng means to generate said laser radiation;
    said retro-reflecting roof prism arranged such that said laser beams received from said laser cavity are reflected back to said laser cavity on at least two paths, said paths being equally spaced about the axis of said lasing means;
    a transverse mode selector disposed between and in optical alignment with both said front optical surface and said mirror means;
    said transverse mode selector arranged in said optical cavity to produce at least two folded cavities within said lasing means which, together with said retro-reflecting prism, generate at least two spatially separated, mutually coherent, in-phase and co-existing laser beams in said lasing means and said optical cavity;
    said mirror means including inner and outer reflecting surfaces, said inner reflecting surface virtually all incident laser radiation back to said lasing means, and said outer reflecting surface only partially reflecting said laser radiation back to said front optical surface and permitting the remainder of said laser radiation to pass therethrough,
    whereby multiple, mutually coherent laser beams are generated by said lasing means.

2. The improved laser as defined by claim 1, where said mirror means comprises a tuned etalon disposed in optical alignment with said aperture and said roof prism, said etalon having said first and second reflecting surfaces.

3. The improved laser as defined by claim 2, wherein said transverse mode selector means includes two pinhole apertures.

4. The improved laser as defined by claim 3, further including Q switching means for Q switching said laser.

5. The improved laser as defined by claim 4, wherein said lasing means includes a ruby rod lasing medium and flashlamp assembly.

* * * * *

UNITED STATES PATENT AND TRADEMARK OFFICE
CERTIFICATE OF CORRECTION

PATENT NO. : 4,564,949

DATED : January 14, 1986

INVENTOR(S) : James D. Trolinger

It is certified that error appears in the above-identified patent and that said Letters Patent is hereby corrected as shown below:

Column 3, line 55, "medium 20" should read -- medium 30 --.
Column 6, line 27, between the words "surface virtually" insert -- reflecting --, Signed and Sealed this Twenty-seventh Day of May 1986

[SEAL]

Attest:

DONALD J. QUIGG

Attesting Officer

Commissioner of Patents and Trademarks